Nov. 3, 1953 — A. E. WILSON ET AL — 2,657,588
TRANSMISSION OPERATING MECHANISM
Filed Sept. 11, 1944 — 3 Sheets-Sheet 1

INVENTORS
HENRY D. HUKILL
ALBERT E. WILSON
BY H. O. Clayton
ATTORNEY

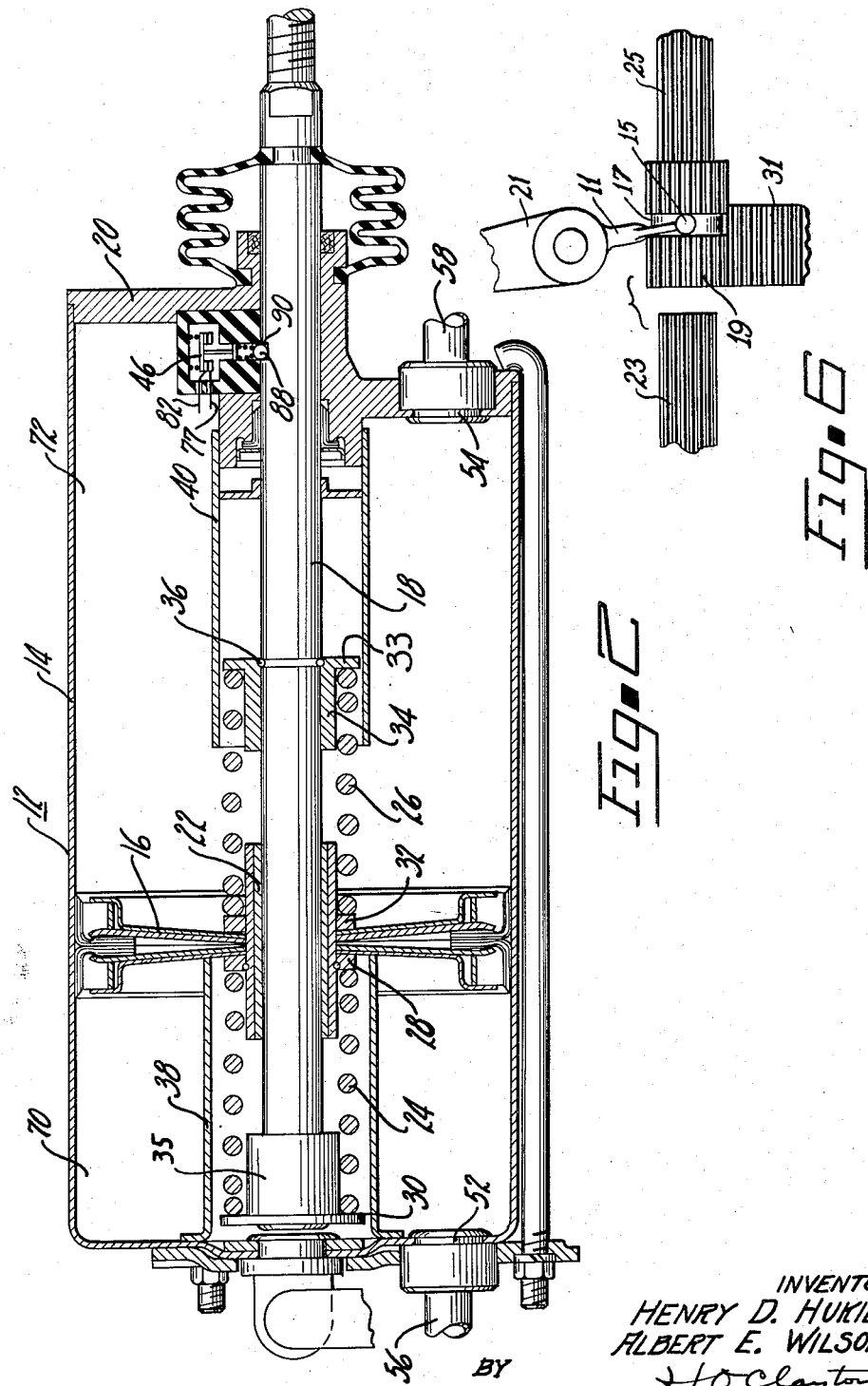

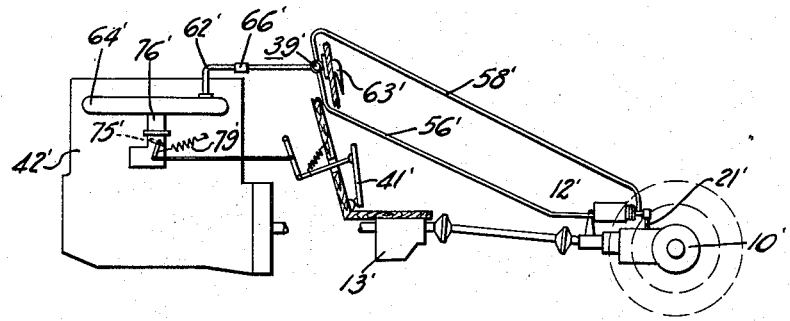
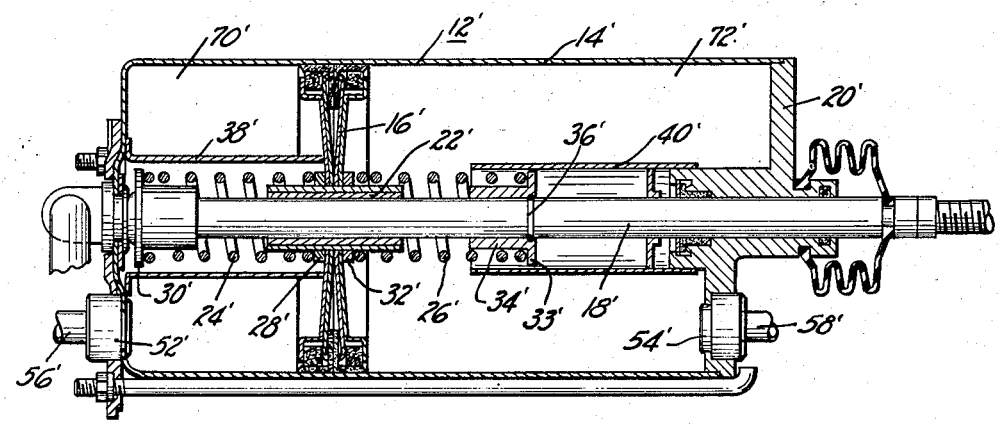

Patented Nov. 3, 1953

2,657,588

UNITED STATES PATENT OFFICE 2,657,588

TRANSMISSION OPERATING MECHANISM

Albert E. Wilson, South Bend, Ind., and Henry D. Hukill, Cleveland, Ohio, assignors to Bendix Aviation Corporation, South Bend, Ind., a corporation of Delaware Application September 11, 1944, Serial No. 553,524

7 Claims. (Cl. 74—472)

1

This invention relates in general to gear shifting mechanism and is of particular utility when employed in connection with speed-changing and direction-reversing gearing commonly used in coupling the internal combustion engine of an automotive vehicle or a tank with the driving vehicle wheels or other propelling devices.

One object of our invention is to provide power means for operating a two-speed transmission gear mechanism said mechanism being operably associated with a differential mechanism of standard construction and mounted adjacent thereto in the power plant of the vehicle. In other words, it is an object of our invention to provide power means for operating the two-speed axle mechanism of the day.

Yet another object of our invention is to provide power means for operating a two-speed axle said power means being controlled by an operation of the accelerator and an operation of a manually operated selector valve.

A further object of our invention is to provide power means for operating a change-speed transmission, such as the selective gear transmission located immediately to the rear of the clutch mechanism or a two-speed axle mechanism, said power means including a spring and vacuum operated double-acting motor the operation of which is controlled by the operation of a manually operated so-called four-way or double three-way selector valve and the operation of the accelerator of the vehicle in its control of the speed of the engine and the degree of gaseous pressure within the intake manifold of said engine.

Yet another object of our invention is to provide, in a power plant of an automotive vehicle, power means for moving, to one or the other of two positions, a gear shifting member of a change-speed transmission mechanism said power means including a motor the power element of which is connected to said gear shifting member by force transmitting means, including a yieldable means, having three distinct stages of operation, said power means being controlled by (1) the operation of a manually operated four-way or double three-way selector valve, (2) the operation of the accelerator of the vehicle in its control of the speed of the engine, the degree of gaseous pressure within the intake manifold of the engine and its control of a switch constituting a part of means for momentarily disabling the ignition system of the engine, and (3) an ignition interrupter switch actuated by means connected with the power element of the motor.

Yet another object of our invention is to provide,

2 in the power plant of an automotive vehicle, power means for moving to one or the other of two positions a gear shifting member of a change-speed transmission of the vehicle said power means including a motor the power element of which is connected to said gear shifting member by force transmitting means having three distinct stages of operation and including yieldable means, said power means being controlled by (1) the operation of a manually operated four-way selector valve and (2) the operation of the accelerator of the vehicle in its control of the throttle valve of the engine of the vehicle.

One of the important features of our invention is to provide a double-acting pressure differential operated motor for establishing a change-speed transmission in one or the other of two settings said motor being connected with said transmission by means including a double-acting yieldable means which is energized, that is cocked, during the first half of the gear shifting movement of the power element of said motor said yieldable means being then operative, after said power element has completed its gear shifting movement to neutralize the transmission, to establish the transmission in gear.

Yet another object of our invention is to provide power means for operating the two-speed axle of an automotive vehicle said power means including a double-acting vacuum motor comprising a casing member detachably secured to the casing of the two-speed axle and further comprising a power element operably connected to a shift fork or equivalent element of the axle mechanism. The force transmitting means interconnecting the shift fork and power element includes a double-acting yieldable means which is of such a strength that the same is cocked, that is the yieldable means is made a source of potential energy, when the vacuum motor is energized to effect an operation of the axle mechanism, said operation being effected prior to the neutralization of the axle mechanism which is effected during the last part of the movement of the power element of said motor, the cocked yieldable means then functioning, after the gears of the axle mechanism to be meshed are brought to synchronous speeds by controlling the speed of the engine of the vehicle, to expand thereby effecting a new setting of the axle mechanism.

Yet another object of our invention is to provide a simple, compact and easily serviced double three-way or oft called four-way valve which may be used to in part control a double-acting motor of a transmission operating mechanism.

One of the most important objects of our invention is to provide, in an automotive vehicle including an internal combustion engine controlled in part by an accelerator operated throttle valve, power means for effecting one or the other of two settings of the change-speed transmission of said vehicle said power means including a double-acting motor the power element of which is connected to the transmission by force transmitting means operating in three distinct stages to shift the transmission from one setting to the other, the operation of the power means being controlled by an operation of the throttle valve and a manually operated or controlled selector valve.

Other objects of the invention and desirable details of construction will become apparent from the detailed description of certain embodiments of the invention described in the specification to follow and disclosed in the accompanying drawings in which:

Figure 2 is a sectional view disclosing the spring and pressure differential operated motor of that embodiment of our invention disclosed in Figure 1;

Figure 4 is a view, similar to Figure 1, disclosing the mechanism of Figure 1 modified to omit the vacuum tank and the torque controlling ignition disabling mechanism;

Figure 5 is a sectional view disclosing the spring and pressure differential operated motor of the mechanism disclosed in Figure 4; and Figure 6 is a sectional view disclosing details of a two-speed rear axle mechanism, said mechanism being established in its low gear setting.

Figure 1:
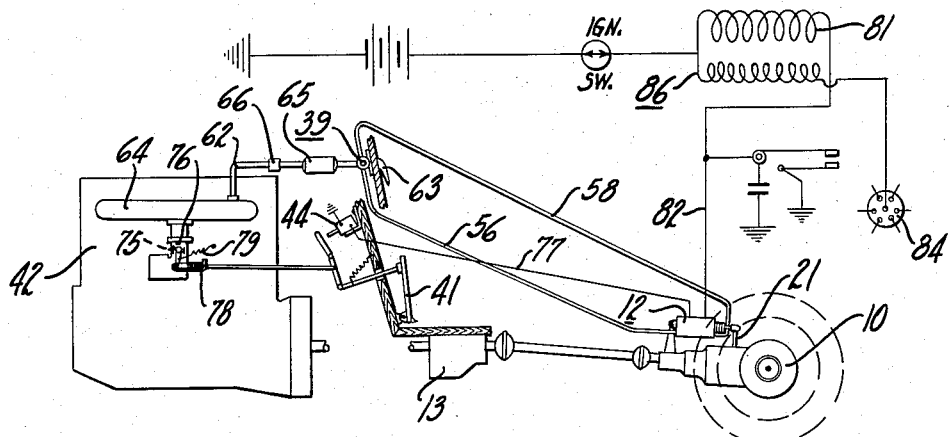
Figure 1 is a diagrammatic view disclosing the preferred embodiment of our invention serving to operate a two-speed rear axle of an automotive vehicle.

Referring now to Figure 1 disclosing one embodiment of our invention a rear axle, generally indicated by the reference numeral 10, is of the two-speed type and the change from one axle speed to another is effected by means of a double-acting double-ended spring and pressure differential operated motor 12 which may be secured to the axle housing or any other suitable mounting. It is to be understood however that our invention is not necessarily limited to means for operating a two-speed axle transmission mechanism; for the double-acting motor 12 of our invention may also be used to operate any multi-speed transmission mechanism i. e. the change speed transmission 13, to establish one or the other of two settings thereof.

The motor 12 comprises a double-ended casing 14, Figure 2, and a piston that is power element 16 the latter being connected to the axle mechanism by a three-stage force transmitting means which constitutes an important feature of our invention.

At this juncture it is to be noted however that our invention is not limited to the particular three-stage operating force transmitting means disclosed in Figure 2 of the drawings; for it is within the purview of our invention to cover the force transmitting means including either a double-acting torsion spring or the yieldable means of Figure 10 of the patent of Earl Price No. 2,402,343 dated June 18, 1946.

Referring now to Figure 2 the force transmitting means disclosed in this figure includes a rod 18 slidably mounted in an end plate 20 of the motor 12 said rod being operably connected at one of its ends to a crank 21, Figure 1. This crank is preferably connected to a shifter fork 11, Figure 6, which is provided with pins 15 fitting within a groove 17 in a rotatable driving gear 19 of the two-speed axle 10. The gear 19 is meshed with a propeller shaft driven driving gear 31; and the gear 19 is internally splined to mesh with the teeth of either one of two driven gear members 23 and 25 depending on the direction of the movement of the member 19. The gear member 23 constitutes one of a nest of gears, not shown, operative when the member 19 is meshed with the member 23, to establish the two-speed rear axle mechanism in its high gear setting and the member 25 constitutes one of a nest of gears, not shown, operative when the member 19 is meshed with the member 25, to establish the two-speed axle mechanism in its low gear setting. No claim is made to the two-speed rear axle mechanism disclosed in Figure 6 and it is to be noted, as stated above, that this mechanism may be of any conventional design wherein a driving member actuated by the propeller shaft of the vehicle is selectively connected with the driven parts of the mechanism to establish the transmission mechanism or so-called two-speed rear axle, in one or the other of its gear ratio settings.

Continuing the description of the force transmitting means interconnecting the motor 12 and two-speed axle 10, a hub portion 22 of the piston 16 is sleeved over the rod 18 and slidable thereon; and said hub 22 is operably connected to said rod by means of yieldable means of a certain strength. In that embodiment of our invention disclosed in Figure 2 this yieldable means consists of two springs 24 and 26 sleeved over the rod 18 said springs preferably being of equal or substantially equal strength. The spring 24, which constitutes a part of the force transmitting means interconnecting the piston 16 and transmission, is interposed between a flange portion 28 of the hub 22 and a flange 30 at the end of and fixedly secured to the rod 18. The spring 26 is interposed between a flange 32, constituting a part of the hub 22, and the flanged end 33 of a sleeve member 34 said sleeve constituting in effect a portion of the rod 18. Movement of the sleeve member to the right, Figure 2, is prevented by a stop ring 36 embedded in the rod 18. Tubular members 38 and 40, fixedly secured at their outer ends to the end plates of the motor casing, serve as stop members to limit the movement of the piston 16.

In that embodiment of our invention disclosed in Figure 1 the operation of the motor 12 is controlled by (1) a four-way selector valve 39, (2) the throttle operating accelerator 41 which in large measure controls the operation of the internal combustion engine 42 of the vehicle, (3) an accelerator operated ignition controlling switch 44 which is closed when the accelerator is fully depressed and (4) an ignition controlling switch 46, Figure 2, which is actuated by the rod 18. It is to be noted here however, as is brought out hereinafter in this specification, that the ignition controlling means of the mechanism disclosed in Figure 1 may be omitted; and the mechanism of Figure 1, so modified, is disclosed in Figure 4. In the latter figure parts which duplicate parts of the mechanism of Figure 1 are identified by the same reference numerals with the addition of a prime.

Figure 3:
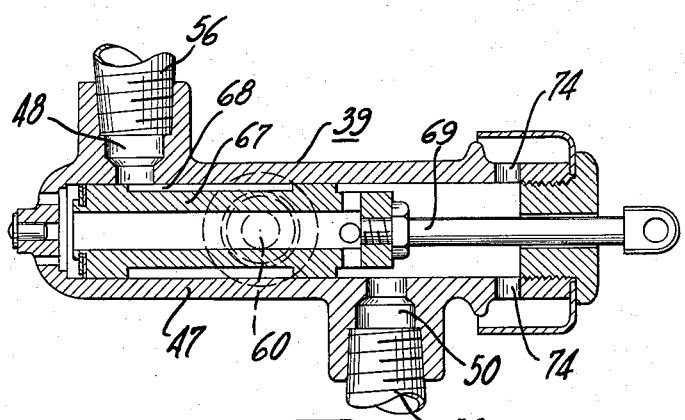
Figure 3 is a sectional view of the double three-way selector valve of our invention.

Referring now to the four-way valve 39 disclosed in detail in Figure 3 the same comprises a hollow casing 47 provided with ports 48 and 50 connected respectively with ports 52 and 54 in the ends of the motor 12 by means of conduits 56 and 58. The casing 47 is also ported at 60 to receive a conduit 62 connected to the intake manifold 64 of the engine. A vacuum tank 65 is incorporated in this conduit and a check valve 66 is incorporated in that portion of the conduit interconnecting the tank with the manifold. This check valve insures the maintenance of the relatively low gaseous pressure within the tank when the accelerator is depressed which operation increases the gaseous pressure in the intake manifold. A spool shaped valve member 67 is slidably mounted within the casing 47. A recess 68 of said member serving to interconnect the ports 60 and 48 when the valve member is moved, by a manually operated selector lever 63, to its high gear position said position of the valve member being disclosed in Figure 3. The selector lever 63 is connected by suitable means, not shown, to a rod 69 which is preferably adjustably connected to the valve member 67.

When the above described high gear setting of the valve 39 is selected by the driver then a compartment 70 of the motor 12, outlined by the piston 16 and a part of the casing 14, is placed in air transmitting connection with the intake manifold 64 via the conduit 62, check valve 66, vacuum tank 65, valve port 60, the recess 68, port 48 and the conduit 56. At this time a compartment 72 of the motor is vented to the atmosphere via ports 74 in the valve casing 47, the interior of the valve, port 50 and the conduit 58. It follows therefore that the piston 16 is then subjected to a differential of pressures forcing the same to the left, Figure 2, to initiate the high gear operation of the spring and vacuum operated motor.

It will be assumed, for the purposes of this description, that this high gear setting of the valve 39 is effected after the vehicle has attained the desired speed with the transmission 10 established in its low gear setting. The driver will at this time probably wish to effect the high gear setting in order to reduce the speed of the engine with the attendant saving of engine fuel and reduction of wear. Continuing the description of the operation of establishing the transmission in its high gear setting when the high gear setting of the valve 39 is effected the piston 16, as previously described, is subjected to a differential of pressures moving the same to the left, Figure 2. It will be assumed that the driver at this time is maintaining the accelerator at least partially depressed to maintain the road speed of the vehicle and effect a partial vacuum in the intake manifold. If the tank 65 were omitted the motor compartment 70 would be partially evacuated despite the absence of said tank however by incorporating said tank and the check valve in the conduit 62 there is insured a substantially constant source of vacuum to make possible an energization of the motor 12 whenver the valve 39 is operated and irrespective of the position of the accelerator. The aforementioned high gear operation or setting of the valve 39 is what may be termed a preselecting operation, that is, the valve is operated prior to the hereinafter described operation of the accelerator. Now with this operation and the resultant vacuum energization of the motor 12, there results a compression of the spring 24 until the same is compressed solid or substantially solid at which time the end of the hub 22 is in abutment with a member 35 abutting the flange 30 and sleeved over the rod 18; and this operation of the mechanism is apparent from an examination of Figures 2 and 5 of the drawings. In other words the spring 24 is then said to be cocked that is potential energy is stored in the same. This cocking of the spring 24 is effected inasmuch as the rod 18 is then held immobile due to the then existing driving load on the teeth of the low speed transmission gears. With this spring cocking operation, which may be defined as a first stage operation of the power means, the piston 16 moves to a position half way or substantially half way between the inner ends of the stops 38 and 40 there being no movement of the rod 18 for reasons explained above.

The driver, to complete the operation of establishing the transmission in its high gear setting, will then release the accelerator to idle the engine thus developing a relatively high vacuum in the intake manifold and also reversing the driving torque of the engine; and with this operation, with the resultant removal of the driving load upon the low speed gears of the transmission and subjection of the piston 16 to a relatively high differential of pressures, there results a bottoming operation of the piston that is said piston resumes its movement to the left, Figure 2, to abut the stop 38. Now with this operation the rod 18 is moved to the left by the relatively high power of the piston 16 to effect the second stage operation of the power means the piston, rod and spring all moving as a unit; and this operation effects a demeshing of the low speed gears of the transmission, the transmission being established in its neutral setting.

The third that is last stage of operation of the power means to establish the transmission in its high gear setting is effected by an expanding operation of the spring 24; and this operation takes place immediately after the gears to be meshed have been synchronized. This synchronization will of course be effected when the engine and the force transmitting means interconnecting the same with the driving gear of the high speed gears have slowed down to a speed to make possible a meshing of said gears. It is to be noted that the force exerted by the spring 24 to effect this high gear meshing operation is materially less than the force exerted by the piston 16 in effecting the aforementioned second stage, that is, demeshing operation of the mechanism. That this is true is evident from the fact that the spring 24 is weak enough to be compressed by the force developed by the piston in effecting the aforementioned first stage operation of the mechanism. Now the latter force is, by virtue of the partial vacuum of the intake manifold during the first stage operation, materially less than the force developed by the piston during the second stage operation of the mechanism, that is, the force developed when the intake manifold is relatively high due to the pumping operation of the engine pistons with the throttle completely closed. Accordingly, it follows, as stated supra, that the force exerted by the spring 24 in its gear meshing operation is materially less than the force exerted by the piston 16 in effecting the demeshing of the gears.

There is thus provided a pressure differential and spring operated power means, controlled by the accelerator and the valve 39, and operable to shift the transmission 10 from a low speed setting to a high speed setting in three distinct stages of operation.

After the transmission 10 is established in its high gear setting the driver will then depress the accelerator to either maintain or increase the road speed of the vehicle as desired.

Should the driver then wish to establish the transmission in its low gear setting say to facilitate the operation of passing a car on the road or to climb a hill he need but operate the valve 39 to establish the same in its low gear setting, and, with the control mechanism disclosed in the drawings, either release or fully depress the accelerator, the latter operation being disclosed and claimed in our Patent No. 2,480,801, dated August 30, 1949, constituting a division of the instant application. When the valve 39 is placed in its low gear setting the compartment 72 is placed in communication with the vacuum tank 65 and the compartment 70 is vented to the atmosphere. The piston 16 then moves to the right, Figure 2, to cock that is compress the spring 26 thereby completing the first stage of the low gear operation of the transmission operating mechanism. The driver will then continue the operation of establishing the transmission in its low gear setting by either fully depressing the accelerator to close the switch 44 or by releasing the accelerator, either operation resulting in a reversal of the engine torque. If the accelerator is fully depressed, an operation which the driver would naturally effect when he wishes to pass a car on the road, then after the throttle valve 75 is completely opened to abut a stop 76 a spring 78 in the connection between the accelerator and throttle will collapse; and during this collapsing operation the switch 44 is closed. It follows that the spring 78 is stronger than a throttle return spring 79. As disclosed in Figure 1 the switch 44 is grounded and is connected by a wire 77, in series with the so-called ignition interrupter switch 46, Figure 2, which is closed when the transmission is established in its high gear setting that is when the rod 18 is in its high gear position. When the transmission is established in its high gear setting the motor parts are positioned as disclosed in Figure 2.

A wire 82, leading from the switch 46, is connected to the distributor 84 of the conventional ignition system of the engine, all as is disclosed in Figure 1. It follows that when the switches 44 and 46 are both closed the primary winding 81 of the ignition coil 86 is grounded thereby disabling the ignition system. This disablingng of the ignition system disables the engine and reverses the driving torque upon the high speed gears of the transmission; and this operation makes possible the second stage operation of the power means that is the bottoming movement of the piston 16 and the concurrent movement of the rod 18 to the right to neutralize the transmission. The motor 12 is at this time vacuum energized to effect this operation by virtue of the inclusion in the vacuum system of the check valve 66 and the vacuum storage tank 65; for if the tank were not incorporated in the vacuum conduit 62 there would be no source of vacuum when the accelerator is fully depressed. Now it is to be noted that the interruption of the ignition is only momentary to effect this neutralizing operation of the transmission by virtue of the fact that when the rod 18 is moved to the right, Figure 2, a ball 88 of the ignition interrupter switch 46 is moved upwardly out of a recess 90; and this operation of the ball serves to open the switch 46.

As to the third stage of operation of the power means to effect the meshing of the low speed gears of the transmission this operation of said power means is effected when the engine has been speeded up sufficiently to effect the necessary synchronization of the low speed gears. This operation is quickly effected inasmuch as it is to be remembered that the throttle is at this time wide open.

If the driver wishes to effect the low gear setting of the transmission without disabling the ignition system he need but first place the valve 39 in its low gear setting, then release the accelerator, and lastly depress the accelerator to speed up the engine. The above described three stages of operation of the power means is then effected inasmuch as this operation of the valve results in the cocking of the spring 26 which constitutes the first stage operation, the reversal of the engine torque by the release of the accelerator effects the demeshing of the high speed gears to neutralize the transmission, said operation constituting the second stage operation, and the subsequent depression of the accelerator to speed up the engine effects the necessary synchronization of the low speed gears to make possible the above described third stage of operation that is the expansion of the spring 26 to effect the low gear operation of the transmission.

There is thus provided a very simple yet efficient three-stage transmission operating mechanism controlled by the accelerator and a selector valve and operating to establish one or the other of two settings of a change-speed transmission mechanism irrespective of where said mechanism is incorporated in the power plant of the vehicle. If the torque controlling ignition disabling mechanism is not desired then the electrical mechanism and the yieldable means in the accelerator operated rod may be omitted. The tank 65 may then also be omitted all as is disclosed in Figures 4 and 5 of the drawings however it is desirable to include the check valve 66 inasmuch as such a valve will insure sufficient vacuum to maintain the spring 26 cocked when the accelerator is depressed in the operation of effecting the second gear setting of the transmission.

In conclusion it is to be stressed that the heart of our invention lies in the construction and arrangement of the motor 12 and the force transmitting means, particularly the yieldable means, interconnecting the power element of said motor with the transmission. This yieldable means, which cooperates with the solid members 18, 30 and 34 and is in series with the power element in said force transmitting means, is of such a strength that its condition is changed, that is potential energy is stored therein, when the selector valve is operated; and the strength of said yieldable means is such that this potential energy storing operation constitutes the first of three stages of operation of the aforementioned force transmitting means. With the shifter mechanism of our invention the transmission is operated quickly and quietly there being no clashing of gears; furthermore the control of the mechanism is so simple that it is submitted that the entire operation is practically fool proof.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the forms hereinbefore described being merely preferred embodiments.

We claim:

1. In an automotive vehicle provided with a change-speed transmission, an internal combustion engine and a carburetor for in part controlling the operation of the engine, said carburetor including a throttle valve operative in part to control the degree of gaseous pressure within the intake manifold of the engine and to control the speed of the engine; power means for operating said transmission comprising a double-acting pressure differential operated motor having a power element operably connected to the transmission, a selector valve for controlling the energization of said motor, air transmitting means interconnecting the intake manifold of the engine, the selector valve and the motor, and a double-acting three-stage operating force transmitting means connecting the aforementioned power element with the transmission, said force transmitting means including a rod connected to the transmission and further including yieldable means of a certain strength concentrically mounted with respect to and abutting a portion of said rod, said force transmitting means being so constructed that with an operation of the selector valve there results a vacuum energization of the motor to effect one of the stages of operation of the force transmitting means, that is, a compression of the yieldable means, another stage of operation of said force transmitting means being then effected by a closing of the throttle valve to reduce the torque of the engine and yet another stage of operation of said force transmitting means being subsequently effected when the engine speed is such as to effect a synchronization of the transmission gears to be meshed.

2. In an automotive vehicle provided with a change-speed transmission, an internal combustion engine and a carburetor for in part controlling the operation of the engine, said carburetor including a throttle valve operative in part to control the degree of gaseous pressure within the intake manifold of the engine and to control the speed of the engine; power means for operating said transmission comprising a double-acting pressure differential operated motor including a power element and a casing, a selector valve for controlling the energization of said motor, air transmitting means interconnecting the intake manifold of the engine, the selector valve and the motor, and force transmitting means connecting the aforementioned power element with the transmission, said force transmitting means including a member secured to the hub portion of the power element, a member operably connected with the transmission and double-acting yieldable means of a certain strength sleeved over said first mentioned member and serving to interconnect said two members; the parts of said force transmitting means being so constructed and arranged and so operative that with an operation of the selector valve to control the operation of the motor and a subsequent operation of the throttle valve to control the torque of the engine and degree of gaseous pressure in the manifold there results an operation of the force transmitting means in three distinct stages in the operation of the power means to effect a change of setting of the transmission.

3. In an automotive vehicle provided with a change speed transmission, an accelerator, an internal combustion engine and a carburetor for in part controlling the operation of the engine, said carburetor including an accelerator operated throttle valve operative in part to control the degree of gaseous pressure within the intake manifold of the engine and to control the speed of the engine; power means for operating said transmission comprising a pressure differential operated motor having a power element operably connected to the transmission, a valve for controlling the operation of said motor, air transmitting means interconnecting the intake manifold of the engine, the control valve and the motor, and force transmitting means connecting the power element with the transmission, said force transmitting means including a plurality of solid members and further including yieldable means connected in series with said solid members, said yieldable means being of such strength that the same may be compressed solid or substantially solid by a force which is less than the force developed by the power element when the control valve is operated to effect an energization of said motor, the engine throttle at the time being opened by the accelerator to effect an engine speed greater than engine idling speed; the parts of the transmission operating power means being so constructed and arranged and so operative that the force transmitting means is operable in three distinct stages to effect an operation of the transmission, the first of said stages serving to effect the aforementioned compression of the yieldable means, said operation being effected, by an energization of the motor, when the control valve is operated at a time when the accelerator is depressed to open the throttle, the second of said three stages of operation of the force transmitting means serving to neutralize the transmission mechanism, said operation being effected when the accelerator is released to close the throttle thereby reversing the engine torque, and the third of said three stages of operation of the force transmitting means serving to establish the transmission in gear, said operation being effected by the expansion of the yieldable means after the gears of the transmission to be meshed are synchronized.

4. In an automotive vehicle provided with a change speed transmission, an accelerator, an internal combustion engine and a carburetor for in part controlling the operation of the engine, said carburetor including an accelerator operated throttle valve operative to in part control the degree of gaseous pressure within the intake manifold of the engine and to control the speed of the engine; power means for operating said transmission comprising a double acting motor responsive to differential fluid pressure in both directions of its movement, said motor having its power element operably connected to the transmission, a selector valve movable to one or the other of two different positions to control the operation of said motor, air transmitting means interconnecting the intake manifold of the engine, the selector valve and the motor, and force transmitting means interconnecting the power element of the motor with the transmission, said force transmitting means comprising a member directly connected to the transmission and further comprising means, including yieldable means and solid members interconnecting said member with the power element of the motor, said yieldable means being of such strength that the same may be compressed solid or substantially solid by a force which is less than the force developed by the power element when the selector valve is operated to effect an energization of said motor, the engine throttle at the time being opened by the accelerator to effect an engine speed greater than engine idling speed; the parts of the transmission operating power means being so constructed and arranged and so operative that the force transmitting means is operable in three distinct stages to effect an operation of the transmission, the first of said stages serving to effect the aforementioned compression of the yieldable means, said operation being effected, by an energization of the motor, when the selector valve is operated at a time when the accelerator is depressed to open the throttle, the second of said three stages of operation of the force transmitting means being completed when the power element is bottomed within the motor, said operation serving to demesh the transmission mechanism and being effected when the accelerator is released to close the throttle thereby reversing the engine torque, and the third of said three stages of operation of the force transmitting means serving to establish the transmission in gear, said operation being effected by the expansion of the yieldable means after the gears of the transmission to be meshed are synchronized, the latter operation being effected by a control of the speed of the engine.

5. A double acting pressure differential operated motor adapted for use in an automotive transmission operating mechanism said motor comprising a double ended cylinder member, a power element reciprocable within the cylinder member, a force transmitting transmission operating rod slidably mounted within the power element and slidably mounted in one end of the cylinder member, a flange member mounted on one end of the rod, a second flange member also mounted on said rod, a force transmitting yieldable member interposed between one face of the power element and one of said flange members, another force transmitting yieldable member interposed between the other face of the power element and the other of said flange members, a stop member secured to one end of the cylinder said member serving as a stop for the power element when the same is power operated in one direction of its movement, and a second stop member secured to the other end of the cylinder said stop member serving as a stop for the power element when the same is power operated in the other direction of its movement.

6. A double acting pressure differential operated motor adapted for use in an automotive transmission operating mechanism said motor comprising a double ended cylinder member, a power element reciprocable within the cylinder member, a force transmitting transmission operating rod slidably mounted within the power element and slidably mounted in one end of the cylinder member, a flange member mounted on one end of the rod, a second flange member also mounted on said rod, a force transmitting yieldable member sleeved over the rod and interposed between one face of the power element and one of said flange members, another force transmitting yieldable member sleeved over the rod and interposed between the other face of the power element and the other of said flange members, a stop member sleeved over the rod and secured to one end of the cylinder said member serving as a stop for the power element when the same is power operated in one direction of its movement, and a second stop member sleeved over the rod and secured to the other end of the cylinder said stop member serving as a stop for the power element when the same is power operated in the other direction of its movement.

7. In actuating means for a shiftable gear ratio selecting member, a supporting member, a reciprocable fork shifting rail mounted on said supporting member, a reversibly operable power actuated member, means limiting travel of said power actuated member to a predetermined distance in either direction, and connecting means between said power actuated member and rail to transmit controlled forces of different magnitudes in immediate sequence to said rail, including means carried by the rail rendered effective during movement of said power actuated member in either direction and operable after conclusion of said movement of said power actuated member to apply a final reduced force to continue movement of the rail in said direction.

ALBERT E. WILSON.
HENRY D. HUKILL.

References Cited in the file of this patent
UNITED STATES PATENTS

| Number | Name | Date |
|---|---|---|
| 1,720,989 | Ahlm | July 16, 1929 |
| 2,001,337 | Wiedmaier | May 14, 1935 |
| 2,267,603 | Claytor | Dec. 23, 1941 |
| 2,275,944 | Breese | Mar. 10, 1942 |
| 2,277,800 | Syrovy | Mar. 31, 1942 |
| 2,277,914 | Kesling | Mar. 31, 1942 |
| 2,348,460 | Fennema et al. | May 9, 1944 |
| 2,356,598 | Lang et al. | Aug. 22, 1944 |
| 2,373,259 | Price | Apr. 10, 1945 |
| 2,398,407 | Brownyer | Apr. 16, 1946 |
| 2,402,343 | Price | June 18, 1946 |

OTHER REFERENCES

Ser. No. 400,816, Lang et al. (A. P. C.), published May 11, 1943.